United States Patent
Gordaninejad et al.

(10) Patent No.: US 6,971,491 B1
(45) Date of Patent: Dec. 6, 2005

(54) MAGNETO-RHEOLOGICAL FLUID ENCASED IN FLEXIBLE MATERIALS FOR VIBRATION CONTROL

(75) Inventors: Faramarz Gordaninejad, Reno, NV (US); Alan Fuchs, Reno, NV (US); Xiaojie Wang, Reno, NV (US); Gregory Henry Hitchcock, Reno, NV (US); Mei Xin, Reno, NV (US)

(73) Assignee: The Board of Regents of the University and Community College System of Nevada, on behalf of the University of Nevada, Reno, Reno, NV (US)

( * ) Notice: Subject to any disclaimer, the term of this patent is extended or adjusted under 35 U.S.C. 154(b) by 0 days.

(21) Appl. No.: 10/331,120

(22) Filed: Dec. 26, 2002

Related U.S. Application Data

(60) Provisional application No. 60/345,794, filed on Dec. 31, 2001.

(51) Int. Cl.[7] .................................................. F16F 9/53
(52) U.S. Cl. .................................. 188/267.2; 188/268.1
(58) Field of Search ............................ 188/267, 267.1, 188/267.2

(56) References Cited

U.S. PATENT DOCUMENTS

| | | | | |
|---|---|---|---|---|
| 6,068,249 | A * | 5/2000 | Shtarkman | 267/140.14 |
| 6,202,806 | B1 * | 3/2001 | Sandrin et al. | 188/267.1 |
| 6,360,856 | B1 * | 3/2002 | Koh | 188/267.1 |
| 6,394,239 | B1 * | 5/2002 | Carlson | 188/267.2 |
| 6,740,125 | B2 * | 5/2004 | Mosler | 623/45 |

* cited by examiner

Primary Examiner—Matthew C. Graham
(74) Attorney, Agent, or Firm—Sierra Patent Group, Ltd.

(57) ABSTRACT

The disclosed device is directed toward magneto-rheological fluid encasement device. The magneto-rheological fluid encasement device comprises a body having at least one containment element defining an interior and an exterior. A magneto-rheological fluid is disposed in the interior of the at least one containment element. At least one magnetic field is in operative communication with the magneto-rheological fluid.

20 Claims, 6 Drawing Sheets

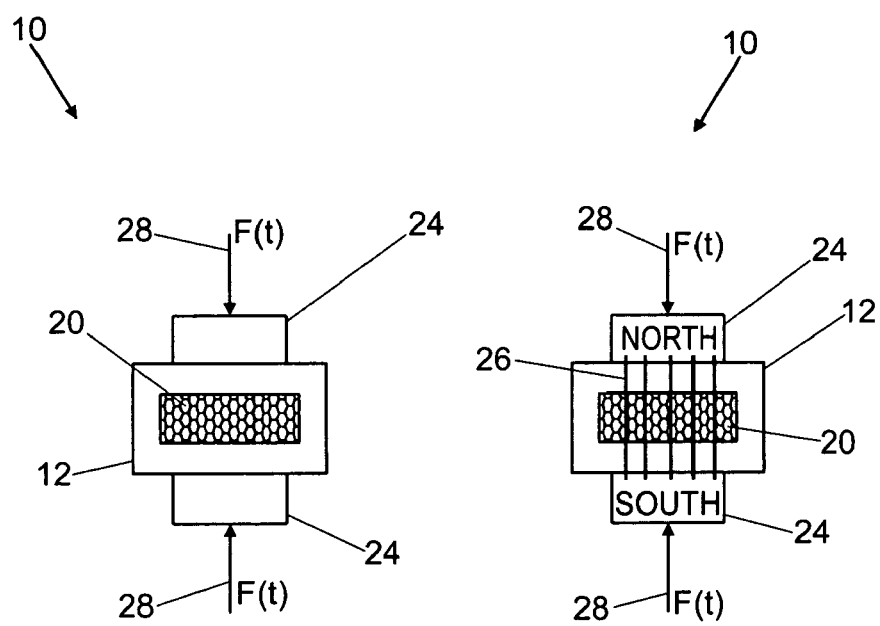
FIG. 5　　　　FIG. 6

MAGNETO-RHEOLOGICAL FLUID ENCASED IN FLEXIBLE MATERIALS FOR VIBRATION CONTROL

CROSS RELATED REFERENCES

This application claims priority to Provisional Patent Application No. 60/345,794 filed on Dec. 31, 2001.

BACKGROUND

The present disclosure relates to magneto-rheological fluid based devices. Particularly the present disclosure relates to an apparatus comprising a flexible encasement filled with magneto-rheological fluid for vibration control.

The magneto-rheological fluid (MRF) based device characteristics are controlled by varying an applied magnetic field that affects the apparent viscosity of the magneto-rheological fluid. Increased magnetic field leads to increased apparent viscosity, which affects the stiffness and damping characteristics of the device.

A magneto-rheological fluid consists of micron sized ferrous particles suspended in a carrier fluid. The rheological behavior of MRF changes under presence of a magnetic field where the ferrous particles polarize. The magnetic field strength, along with the direction of the magnetic flux created by an electromagnet, determines the effect on apparent viscosity of the MRF. The iron particles chain up through attraction in the direction of the magnetic flux and the strength of their attraction is directly related to the strength of the magnetic field, as well as the shape and size of the particles. These factors directly affect apparent viscosity of the MRF. A MRF is capable of changing rheology within milliseconds under an applied magnetic field, which makes the MRF ideal for control applications.

The prior art applications have been limited due to the nature of the conduits and containing structures employed. MRFs have traditionally been contained in rigid pipes, valve bodies and shock absorber casings. These structures have specific but limited uses in relation to vibration mitigation and control. Additionally, a MRF as working fluid in use with the rigid prior art structures exhibits wear characteristics within the rigid structures. The wear characteristics limit the useful life of the devices that employ the MRF. What is needed in the art is a less rigid containment structure for use with a MRF.

SUMMARY

The disclosed device is directed toward magneto-rheological fluid encasement device. The magneto-rheological fluid encasement device comprises a body having at least one containment element defining an interior and an exterior. A magneto-rheological fluid is disposed in the interior of the at least one containment element. At least one magnetic field is in operative communication with the magneto-rheological fluid.

BRIEF DESCRIPTION OF THE DRAWING FIGURES

FIG. 5 is an exemplary embodiment of the MRF encasement device 10 illustrated in a passive mode;

FIG. 6 is an exemplary embodiment of the MRF encasement device 10 illustrated in an active mode;

DETAILED DESCRIPTION

Persons of ordinary skill in the art will realize that the following description of the present invention is illustrative only and not in any way limiting. Other embodiments of the invention will readily suggest themselves to such skilled persons having the benefit of this disclosure.

Figure 1:
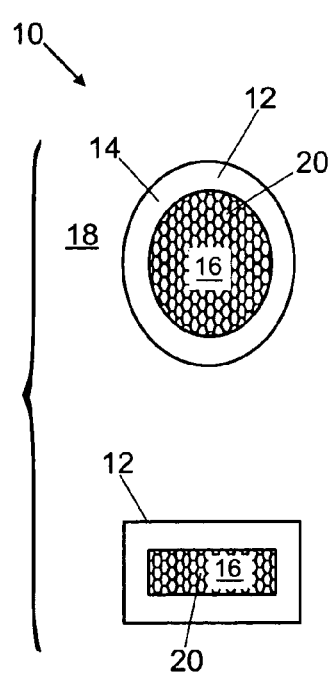
FIG. 1 is an illustration of an exemplary magneto-rheological fluid encasement apparatus in plan and side views.

Referring to FIG. 1, an exemplary magneto-rheological fluid encasement device, or simply MRF encasement device 10, is shown in both a plan view and a side view. The MRF encasement device 10 includes a body 12 having a containment element 14 defining an interior 16 and an exterior 18 of the body 12. The containment element 14 has magneto-rheological fluid, MRF 20 disposed within the interior 16. The containment element 14 has the characteristics of being flexible and resilient. The containment element 14 is also a durable and tough material possessing high resistance to tearing, abrasion and puncture, thus enabling the containment element 14 to withstand great tension and compression forces both from the interior 16 and the exterior 18 of the body 12. In one embodiment, the materials employed includes rubber-like materials.

Figure 2:
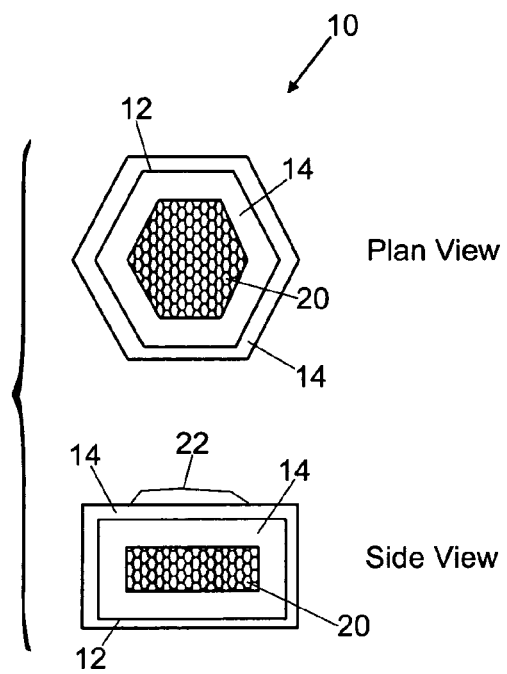
FIG. 2 is an illustration of another exemplary magneto-rheological fluid encasement apparatus in plan and side views.

Also referring to FIG. 2, another exemplary embodiment of the MRF encasement device 10 is shown in plan view and side view. The containment element 14 being flexible and resilient allows for the body 12 of the MRF encasement device 10 to form into a plurality of shapes and forms. FIG. 1, illustrates a circular shape and FIG. 2 illustrates a hexagonal shape for the body 12. It is contemplated that any number of shapes can be formed by the body 12 of the MRF encasement device 10. The body 12 of the MRF encasement device 10 can be preformed into a shape or simply adapted to a form based on the desired application of the MRF encasement device 10 and the environmental conditions that exist at the exterior 18.

The containment element 14 can be a single contiguous material, a composite of materials, an assembly of various materials integrated into a single containment element 14, and any combination thereof. Multiple materials can be interlaced, meshed, overlapped, and the like to form a single containment element 14. A single material can be used and formed into multiple sheets or portions and sealably coupled together to form a single containment element 14. Multiple materials can be integrally commingled to form a single containment element 14, such as a sheet material comprising multiple substrates, a single substrate formed of multiple materials blended together into a composite material, a single substrate with reinforcement elements such as cords, fibers, particles, and the like. It is also contemplated that more than one containment element 14 can be employed to form a single body 12. A contiguous first containment element 14 can be encased by a second containment element 14 forming a single body 14. Any number of containment elements 14 can be assembled to form a single body 12.

For example, as illustrated in FIG. 2, a first containment element 14 can be employed having MRF 20 disposed in the interior 16 and a second containment element 14 can be disposed over the first containment element 14 to form the body 12. The first containment element 14 can be less durable, i.e., resistant to abrasion, but more compatible with the MRF 20. The second containment element 14 can be more resistant to abrasion and exterior environmental conditions. The MRF encasement device 10 in the above example can be arranged such that optimum function and long service life can be designed into the device. The containment element 14 can be constructed such that specific portions of the exterior are made of materials compatible with the external environment, such as abrasion, chemical exposure, thermal exposure, and the like. Additionally, a reinforcement portion 22 can be integrated into the containment element 14 for specific purposes such as resistance to external wear, or to enhance surface adhesion when assembled in mechanical systems.

Figure 3:
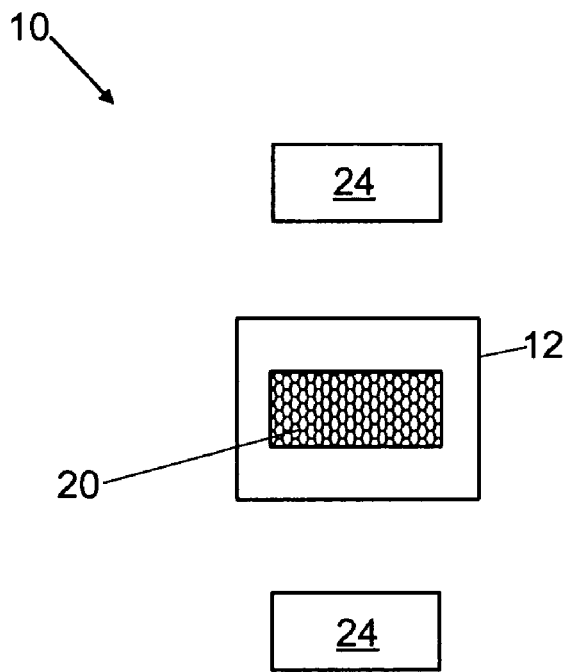
FIG. 3 is an illustration of an exemplary magneto-rheological fluid encasement apparatus in a side view.

Referring to FIG. 3 an exemplary MRF encasement device 10 is illustrated. The MRF encasement device 10 includes magnetic poles 24 in operative communication with the body 12. The body 12 can be disposed between the magnetic poles 24 such that the magnetic poles 24 can interact with the MRF 20. As illustrated in FIG. 3 the magnetic poles are not generating a magnetic field. The magnetic poles 24 can be from a permanent magnet, or an electro-magnet, or any combination thereof.

Figure 4:
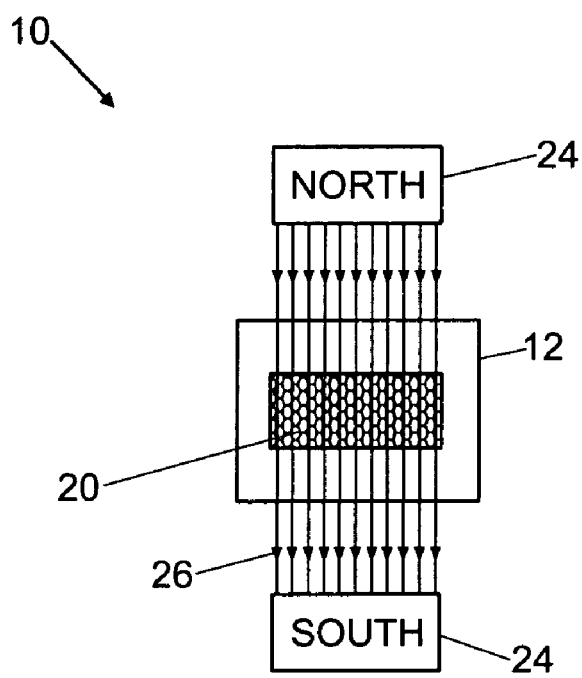
FIG. 4 is an illustration of an exemplary magneto-rheological fluid encasement apparatus showing magnetic field lines in a side view.

Referring to FIG. 4 an exemplary MRF encasement device 10 is illustrated depicting magnetic field lines interacting with the MRF 20. The magnetic poles 24 in operative communication with the MRF 20 can produce magnetic field lines or magnetic flux 26. The magnetic flux 26 interacts with the MRF 20 and activates the MRF 20, such that the rheology of the MRF 20 is altered. The rheology of the MRF can be changed in milliseconds under the applied magnetic field 26. The iron particles in the MRF 20 react to the magnetic flux 26 passing through the MRF 20 by chaining through attraction. Ferrous particles in suspension within the MRF have a high relative permeability making them highly susceptible to magnetic fields where the magnetic filed can reside within the ferrous material as compared to other metals such as aluminum which has a very small permeability not much greater than air, thus not allowing the magnetic field to take residence within the aluminum. The mechanism within the ferrous particle suspension that causes the formation of particle chains occurs within increasing magnetic filed strength. As the magnetic field strength increases, the dipole moment created within the ferrous particle increases and thus the overall attraction between suspended iron particles increase and the chains form increasingly more dense associations until they form columns. The iron particles align in relation to the direction of the magnetic flux lines 26. The strength of the attraction force between the iron particles is directly related to the strength of the magnetic field passing through the MRF 20. The apparent viscosity of the MRF 20 is affected by the magnetic flux 26. The chained-up particles form a controllable distributed nonlinear biasing member (spring) and a controllable distributed nonlinear damper. This allows increases in the loss and storage capacity of the MRF encasement device 10. Therefore, the MRF 20 changes stiffness and damping in reaction to external forces applied to the MRF 20.

Referring to FIGS. 5 and 6, an exemplary embodiment of the MRF encasement device 10 is illustrated in a passive and in an active mode respectively. FIG. 5 illustrates the MRF encasement device 10 with the body 12 between magnetic poles 24 in the passive mode. The magnetic poles 24 are not activated, so that no magnetic flux passes through the MRF 20. Force lines 28 depict opposing forces that can act on the MRF encasement device 10, while in service. An example can be the force of a moving object external to and above the MRF encasement device 10 and the equal but opposite force of a stationary object external to and below the MRF encasement device 10. It is contemplated that any combination or variation of forces can act on the MRF encasement device 10. For brevity and simplicity, the above example is used for purposes of teaching the embodiments in this disclosure. With magnetic poles in a non-activated state, the MRF encasement device 10 reacts to the external forces 28 in a passive mode. The body 12 being flexible and resilient and having the MRF 20 disposed in the interior 16, reacts to the external forces by deforming. Thus, in the non-activated mode, the MRF encasement device 10 behaves passively in reaction to any external forces, such as vibration. When the magnetic poles 26 are activated as illustrated in FIG. 6, there is a magnetic flux 26 passing through the MRF 20, leaving the MRF encasement device 10 in an active mode. The MRF encasement device 10 reacts to the external forces 28 in an active mode through a variable magnetic field strength regulated by an external controller which can deliver the appropriate amount of stiffness and damping to control the motion of the body 12 in reaction to the forces 28. The apparent viscosity alters with the application of the magnetic flux 26 resulting in more MRF fluid resistance to the external forces 28.

The resistance to the external forces 28 and the reaction of the body 12 to the external forces 28 can be controlled by the magnetic flux 26 through the MRF 20 is also varied. Thus, the active mode can variably dampen time-dependent external forces 28, such as in a random vibration. Additionally, the nature of the MRF encasement device 10 having a body 12 with flexible and resilient properties, can also variably supply stiffness or rigidity to external structures as well. The MRF encasement device 10 can be used as a single body 12, as well as in unison with multiple bodies 12.

Figure 7:
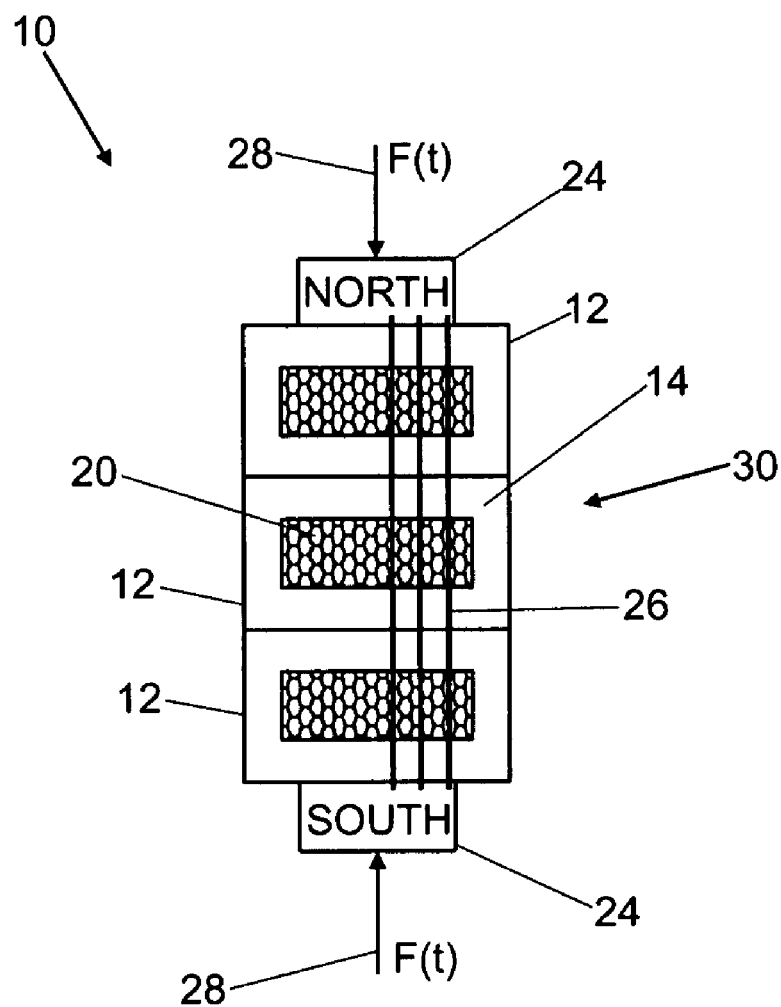
FIG. 7 illustrates an alternate embodiment of the MRF encasement device 10 with multiple bodies 12 in unison.

FIG. 7 illustrates an alternate embodiment of the MRF encasement device 10 with multiple bodies 12 in unison. FIG. 7 illustrates a series arrangement 30 of the bodies 12 stacked between the magnetic poles 24 and subjected to the external forces depicted by force lines 28. In the series arrangement 30, the multiple bodies 12 forming the MRF encasement device 10 can provide increased damping, as well as, a variety of material characteristics. FIG. 7 illustrates only two magnetic poles, however, it is contemplated that multiple poles 24 can be employed to provide magnetic flux 26 of various intensity or strength. The series arrangement 30 of the bodies 12 allows for varying the type of body 12, as well as the type of containment element 14 per body 12 in the MRF encasement device 10. With the variation of body 12 and material makeup of each containment element 14, the MRF encasement device 10 can be designed for many applications and environments. For example, a first body 12 comprising abrasion resistant material in the containment element 14 can be placed in a position proximate a force generation device (not shown). A second body 13 comprising a containment element 14 having greater range of flexibility can be located between the first body 12 and a third body 15 that includes a containment element 14 comprising material resistant to chemical attack. The above exemplary series arrangement 30 can exhibit multiple properties to provide optimum damping, as well as wear and service life in specific applications. A series arrangement 30 is not the only arrangement contemplated in the disclosure.

Figure 8:
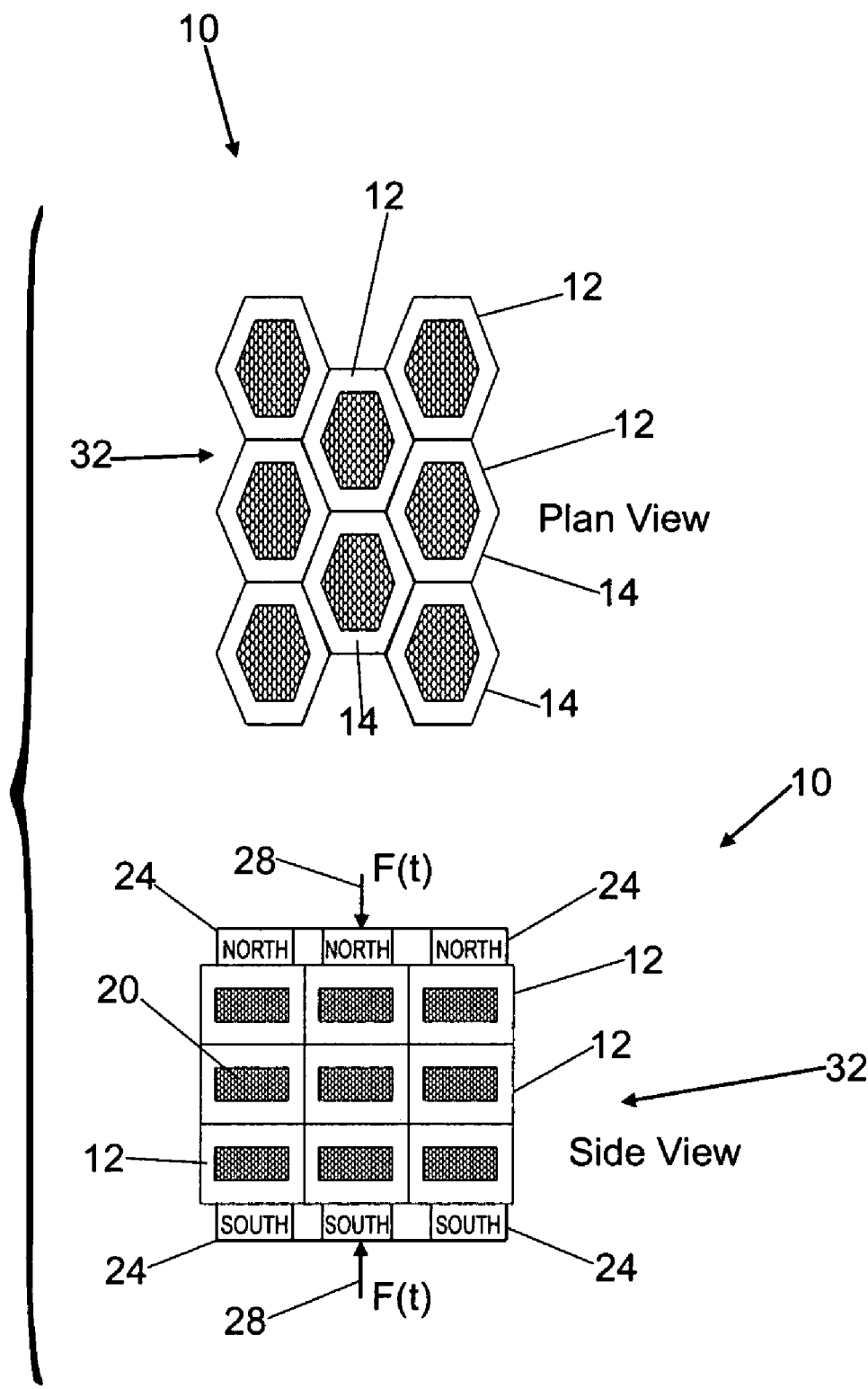
FIG. 8 illustrates another exemplary arrangement of the MRF encasement device 10 in both a plan view and a side view.

FIG. 8 illustrates another exemplary arrangement of the MRF encasement device 10 in both a plan view and a side view. The MRF encasement device 10 can be configured as multiple bodies 12 arranged into an amalgamation or array 32. The array 32 can be an arrangement of bodies 12 in a fashion that optimizes the structural and material features of each individual body 12 in the array 32. Bodies 12 can be adjacent, meshing, offset, in parallel, symmetrical, asymmetrical, and the like. FIG. 8 illustrates an exemplary array 32 of hexagonal bodies 12 positioned adjacently as well as stacked in alignment. Multiple magnetic poles 24 are employed with the array 32. The force lines 28 illustrate the external forces that act on the MRF encasement device 10. In the array 32, there can be any combination of different bodies 12 as well as a variation of containment elements 14 with each body 12. With the array 32, the MRF encasement device 10 can be designed to perform in multiple functions and applications. The array 32 also allows for greater loading and reaction to a wider variety of external forces and external environments.

Figure 9:
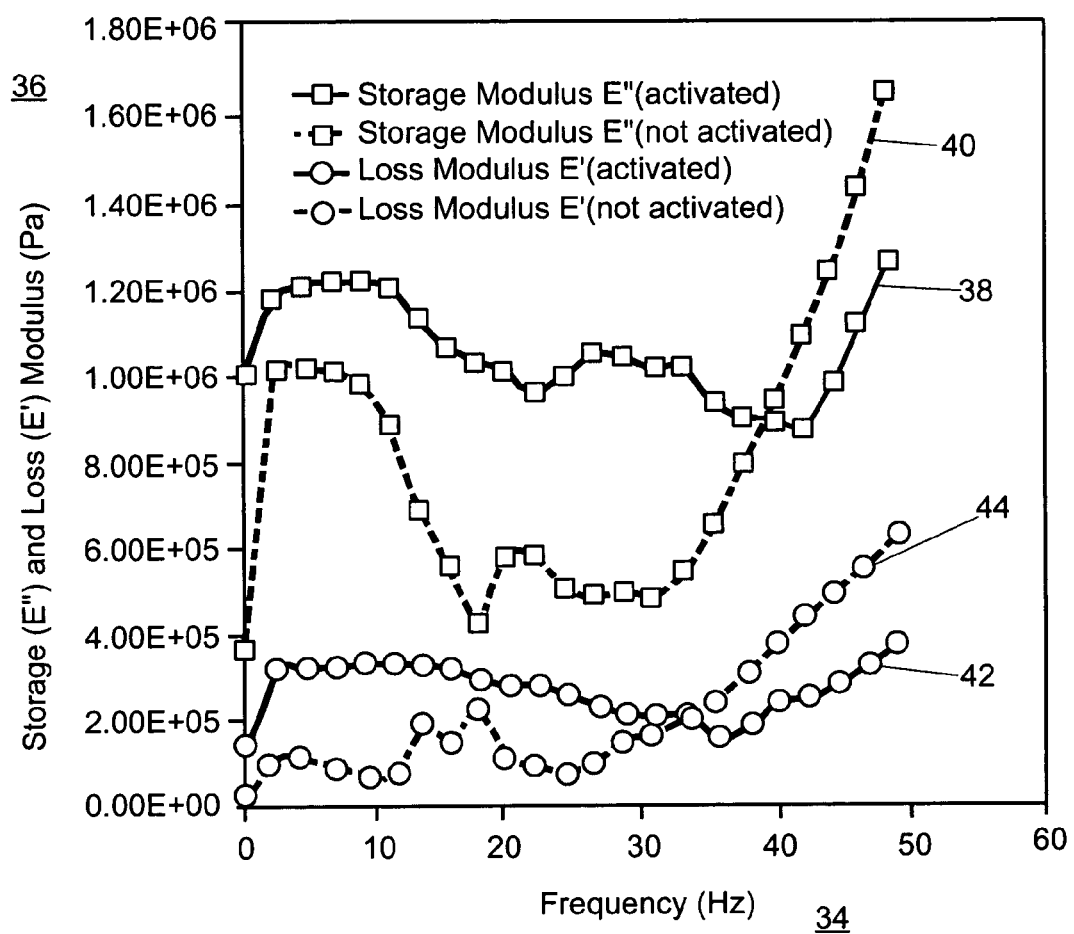
FIG. 9 illustrates a graph of typical results for storage and loss moduli as a function of frequency for passive and active cases.

FIG. 9 illustrates typical experimental results which demonstrate variations of storage and loss moduli with respect to frequency at passive and active modes. The graph illustrates test results of an exemplary MRF encasement device 10 over a wide range of frequencies. The x-axis 34 represents frequency in units of hertz. The y-axis 36 represents both storage and loss moduli in Pascal units. Trend 38 depicts a storage modulus E in an activated state. The numeral 40 depicts a storage modulus, E, in a non-activated state. "E" represents the degree of elasticity of the material. The trend 42 depicts a loss modulus, E, in an activated state. The trend 44 depicts a loss modulus, E, in a non-activated state.

As in the basic application of a single body 12 with a single containment element 14 and a single pair of magnetic poles 24, the MRF encasement device 10 has no moving parts excluding the flexure of the containment element 14 and relative flow of MRF 20. The advantage of having no moving parts ensures a more durable and reliable device.

The MRF encasement device can potentially be used in fields including, but not limited to, automotive, aerospace, electronic packaging and safety devices for earthquake mitigations where vibration isolation and damping is needed. These devices can be developed from micro-scale to large-scale for a wide range of applications. The robustness and simplicity of an MRF encasement device offers controllable vibration isolation without mechanically complex moving parts, which are vulnerable to wear induced failure and external mechanical system malfunction.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A magneto-rheological fluid encasement device comprising:
    a body having at least one containment element defined by a casing having an interior and an exterior;
    a magneto-rheological fluid completely encased on all sides within said interior of said casing, wherein said magneto-rheological fluid is not exposed to said exterior of said casing; and
    at least one magnetic field in operative communication with said magneto-rheological fluid,
    wherein said encasement device forms a controllable nonlinear biasing spring that provides resistance to external forces operating to squeeze the encasement device.

2. The magneto-rheological fluid encasement device of claim 1 further comprising:
    a reinforcement portion coupled to said at least one containment element.

3. The magneto-rheological fluid encasement device of claim 1 wherein said at least one containment element comprises a first containment element and a second containment element configured in series.

4. The magneto-rheological fluid encasement device of claim 1 wherein said at least one containment element comprises a first containment element and a second containment element configured in an array.

5. The magneto-rheological fluid encasement device of claim 1 wherein said at least one containment element comprises multiple materials.

6. The magneto-rheological fluid encasement device of claim 1 wherein said at least one containment element comprises a plurality of integrated materials.

7. The magneto-rheological fluid encasement device of claim 1 wherein said at least one containment element comprises a plurality of materials blended into a single containment element.

8. The magneto-rheological fluid encasement device of claim 1 wherein said at least one containment element comprises at least one reinforcement element.

9. The magneto-rheological fluid encasement device of claim 8 wherein said at least one reinforcement element is selected from the group consisting of cords, fibers and particles.

10. The magneto-rheological fluid encasement device of claim 1 wherein said at least one containment element is disposed in a second containment element forming a single body.

11. The magneto-rheological fluid encasement device of claim 1 wherein a plurality of oppositely charged magnetic poles is in operable communication with said magneto-rheological fluid.

12. The magneto-rheological fluid encasement device of claim 1 wherein said magnetic field is formed by at least one pair of oppositely charged magnetic poles in operative communication with said magneto-rheological fluid.

13. The magneto-rheological fluid encasement device of claim 12 wherein said at least one pair of oppositely charged magnetic poles is selected from the group consisting of a permanent magnet and an electro-magnet.

14. A method of damping vibration using a magneto-rheological fluid encasement device having a body, said body including a containment element defined by a casing having an interior and an exterior, said method comprising:
    completely encasing a magneto-rheological fluid on all sides within said interior of said casing, wherein said magneto-rheological fluid is not exposed to said exterior of said casing;
    coupling said magneto-rheological fluid with at least one magnetic field;
    coupling said containment element to a vibration source;

passively damping vibration with said magneto-rheological fluid; and actively damping said vibration with said magneto-rheological fluid, wherein said magneto-rheological encasement device acts as a controllable nonlinear biasing spring providing resistance to external forces that operate to squeeze the encasement device.

15. The method of claim 14 further comprising:

sensing said vibration from said vibration source; and activating said magnetic field in reaction to said vibration sensed.

16. The method of claim 14 wherein said actively damping said vibration includes reacting to external forces through applying variable magnetic field strength and regulating said magnetic field strength by a controller.

17. The method of claim 14 further comprising:

controlling motion of said body in reaction to forces acting on said body.

18. The method of claim 14 wherein actively dampening includes variably dampening time-dependent external forces.

19. The method of claim 14 further comprising:

supplying rigidity to external structures.

20. The method of claim 14 further comprising:

coupling a second body to said body, said second body having an encasement element and having magneto-rheological fluid in said encasement element;

coupling said magneto-rheological fluid of said second body with at least one magnetic field;

coupling said containment element of said second body to a vibration source;

passively damping vibration;

actively damping said vibration.

* * * * *